(12) United States Patent
Ueda

(10) Patent No.: US 10,652,351 B2
(45) Date of Patent: May 12, 2020

(54) LOCK-FREE WEAK-REFERENCE HYBRID CACHE

(71) Applicant: INTERNATIONAL BUSINESS MACHINES CORPORATION, Armonk, NY (US)

(72) Inventor: Takanori Ueda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 16/014,594

(22) Filed: Jun. 21, 2018

(65) Prior Publication Data

US 2019/0394293 A1 Dec. 26, 2019

(51) Int. Cl.
*H04L 29/08* (2006.01)
*G06F 12/0871* (2016.01)

(52) U.S. Cl.
CPC ...... *H04L 67/2842* (2013.01); *G06F 12/0871* (2013.01); *H04L 67/10* (2013.01); *G06F 2212/314* (2013.01)

(58) Field of Classification Search
None
See application file for complete search history.

(56) References Cited

U.S. PATENT DOCUMENTS

| | | | | |
|---|---|---|---|---|
| 5,170,466 | A | * | 12/1992 | Rogan .................. G06F 16/58 715/255 |
| 6,237,060 | B1 | * | 5/2001 | Shilts .................. G06F 12/0253 711/100 |
| 8,667,223 | B2 | | 3/2014 | Chadwick, Jr. et al. |
| 8,843,706 | B2 | | 9/2014 | Heil et al. |
| 9,047,223 | B2 | | 6/2015 | Hu et al. |
| 2009/0037500 | A1 | * | 2/2009 | Kirshenbaum ....... G06F 16/137 |
| 2010/0115204 | A1 | | 5/2010 | Li et al. |
| 2010/0275044 | A1 | | 10/2010 | Balakrishnan et al. |
| 2017/0161193 | A1 | | 6/2017 | Ueda |

OTHER PUBLICATIONS

Bansal et al., "CAR: Clock with Adaptive Replacement", Proceedings of the Third USENIX Conference on File and Storage Technologies. Mar. 31-Apr. 2, 2004. pp. 1-15.
Beckmann et al., "Modeling Cache Performance Beyond LRU", 2016 Institute of Electrical and Electronics Engineers (IEEE) International Symposium on High Performance Computer Architecture (HPCA). Mar. 12-16, 2016. pp. 1-13.

* cited by examiner

*Primary Examiner* — Scott B Christensen
(74) *Attorney, Agent, or Firm* — Tutujian & Bitetto, P.C.; Vazken Alexanian

(57) ABSTRACT

A computer-implemented method is presented for caching content. The method includes storing content received from a data stream, employing a cache array and a retrieval data structure to process the content, determining, by the processor, if the content is popular content which appears frequently, a position in the cache array holding a strong reference to the content, determining, by the processor, if the content is unpopular content which appears infrequently, an arbitrary position in the cache array holding a strong reference to the unpopular content, the retrieval data structure holding a weak reference to the content, and issuing cached content to a cache data storage device accessed by a user interface of a computing device communicating with the data processing system.

20 Claims, 10 Drawing Sheets

LOCK-FREE WEAK-REFERENCE HYBRID CACHE

BACKGROUND

Technical Field

The present invention relates generally to cache technology and more specifically, to a lock-free weak reference hybrid cache technology.

Description of the Related Art

Cache technology has been widely used to improve computing performances of computer systems. Various cache technology and cache systems have been known so far, and among various cache systems, an application cache is widely used to improve computing performances of applications such as web applications, database applications and/or search engine applications.

SUMMARY

In accordance with an embodiment, a method is provided for caching content. The method includes storing content received from a data stream, employing a cache array and a retrieval data structure to process the content, determining, by the processor, if the content is popular content which appears frequently, a position in the cache array holding a strong reference to the content, determining, by the processor, if the content is unpopular content which appears infrequently, an arbitrary position in the cache array holding a strong reference to the unpopular content, the retrieval data structure holding a weak reference to the content, and issuing cached content to a cache data storage device accessed by a user interface of a computing device communicating with the data processing system.

In accordance with an embodiment, a system is provided for caching content. The system includes a memory and one or more processors in communication with the memory configured to store content received from a data stream, employ a cache array and a retrieval data structure to process the content, determine, by the processor, if the content is popular content which appears frequently, a position in the cache array holding a strong reference to the content, determine, by the processor, if the content is unpopular content which appears infrequently, an arbitrary position in the cache array holding a strong reference to the unpopular content, the retrieval data structure holding a weak reference to the content, and issue cached content to a cache data storage device accessed by a user interface of a computing device communicating with the data processing system.

In accordance with yet another embodiment, a non-transitory computer-readable storage medium comprising a computer-readable program for caching content is presented. The non-transitory computer-readable storage medium performs the steps of storing content received from a data stream, employing a cache array and a retrieval data structure to process the content, determining, by the processor, if the content is popular content which appears frequently, a position in the cache array holding a strong reference to the content, determining, by the processor, if the content is unpopular content which appears infrequently, an arbitrary position in the cache array holding a strong reference to the unpopular content, the retrieval data structure holding a weak reference to the content, and issuing cached content to a cache data storage device accessed by a user interface of a computing device communicating with the data processing system.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for implementing a cache mechanism including a cache array and an index structure. In computing, a cache is a high-speed data storage layer which stores a subset of data, usually transient in nature, so that future requests for that data are served up faster than is possible by accessing the data's primary storage location. Caching allows users to efficiently reuse previously retrieved or computed data. The data in a cache is generally stored in fast access hardware and can also be used in correlation with a software component. A cache's primary purpose is to increase data retrieval performance by reducing the need to access the underlying slower storage layer.

Embodiments in accordance with the present invention provide methods and devices for implementing an eviction mechanism for deciding which elements to evict when the cache is full to increase data retrieval performance. When a content is accessed, the bit in the corresponding position of an access-history bit vector is set. When a victim needs to be selected and the new content is deemed to be unpopular, the method performs a scan over the access-history bit vector to find a zero bit from a last position while clearing each bit until a zero bit is found. If the scan finds a zero bit, the method overwrites the reference in the cache array of which position corresponds to the zero bit in the history vector. When the new content is deemed to be popular and the position in the cache array that is supposed to hold the popular content holds an unpopular content, the method overwrites the reference in the cache array if the corresponding bit in the history vector is zero. If the corresponding bit in the history vector is not zero, the method clears the bit and does not cache the popular content at this time.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
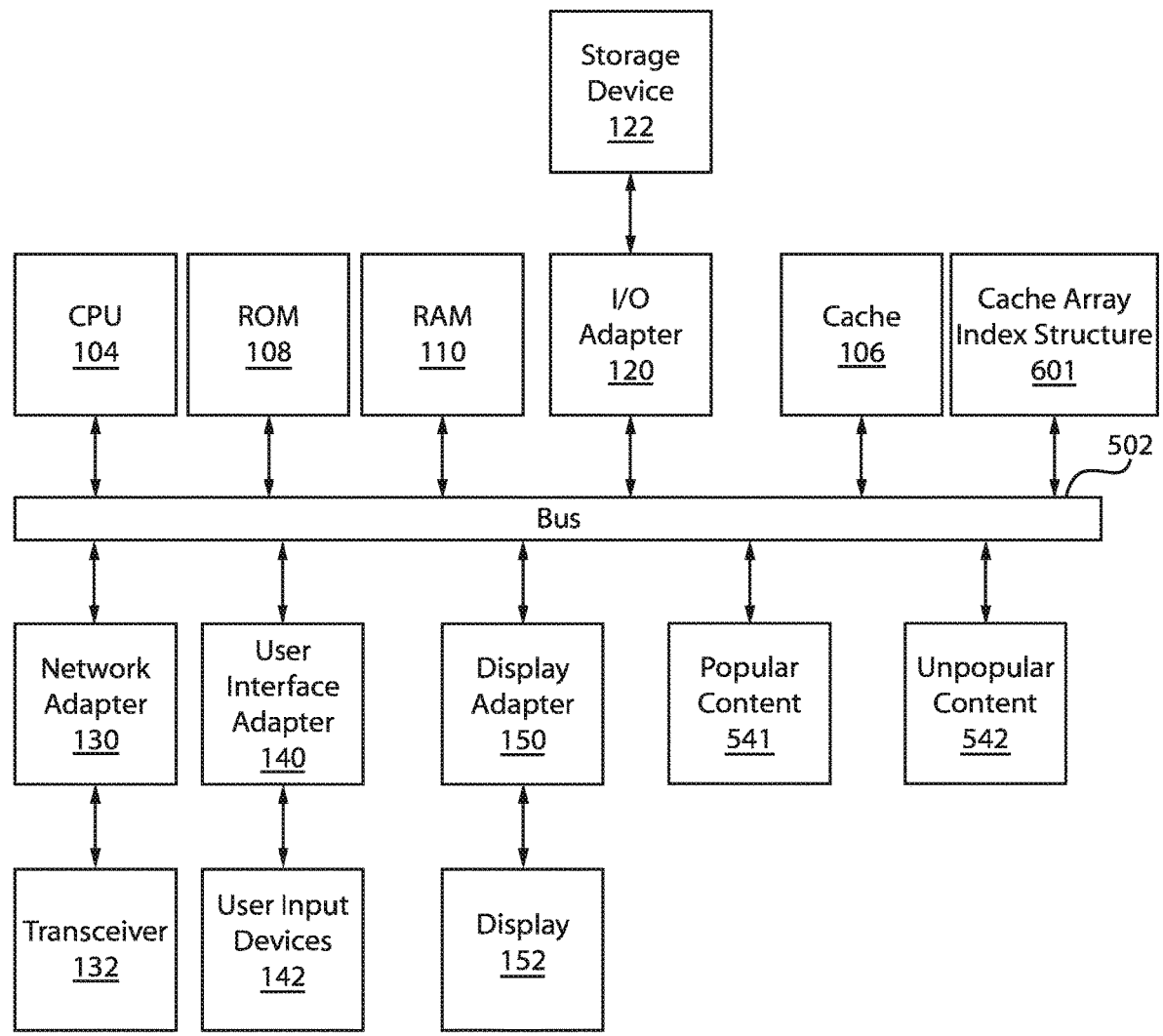
FIG. 1 is an exemplary processing system for a cache mechanism processing popular content and unpopular content requests, in accordance with embodiments of the present invention.

FIG. 1 is an exemplary processing system for a cache mechanism processing popular content and unpopular content requests, in accordance with embodiments of the present invention.

The processing system includes at least one processor (CPU) 104 operatively coupled to other components via a system bus 502. A cache 106, a Read Only Memory (ROM) 108, a Random Access Memory (RAM) 110, an input/output (I/O) adapter 120, a network adapter 130, a user interface adapter 140, and a display adapter 150, are operatively coupled to the system bus 502. Additionally, a cache array/index structure 601 can be connected to the system bus 502 in order to process popular content 541 and unpopular content 542.

A storage device 122 is operatively coupled to system bus 502 by the I/O adapter 120. The storage device 122 can be any of a disk storage device (e.g., a magnetic or optical disk storage device), a solid state magnetic device, and so forth.

A transceiver 132 is operatively coupled to system bus 502 by network adapter 130.

User input devices 142 are operatively coupled to system bus 502 by user interface adapter 140. The user input devices 142 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 142 can be the same type of user input device or different types of user input devices. The user input devices 142 are used to input and output information to and from the processing system.

A display device 152 is operatively coupled to system bus 502 by display adapter 150.

Of course, the processing system can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 2:
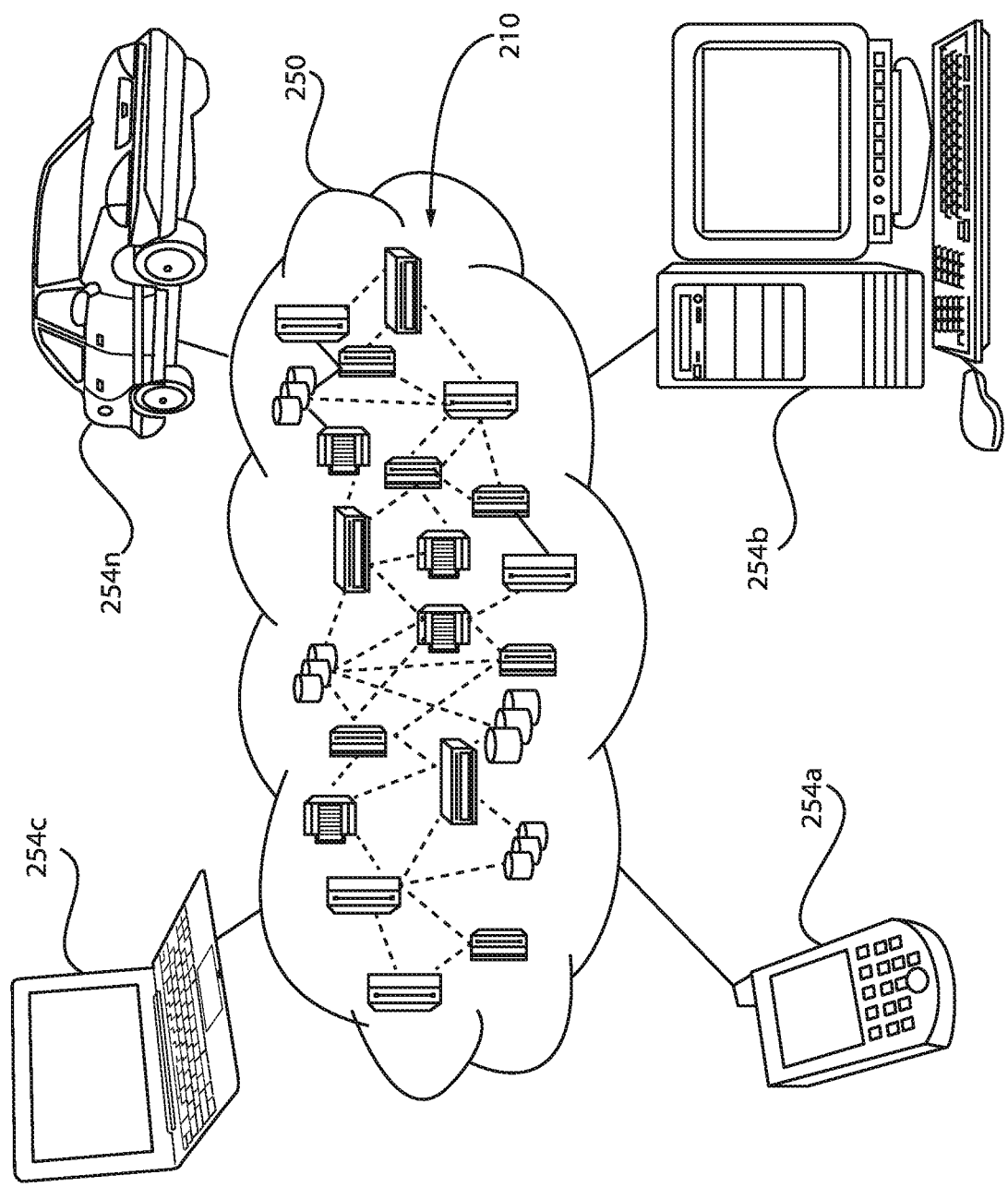
FIG. 2 is a block/flow diagram of an exemplary cloud computing environment, in accordance with an embodiment of the present invention.

FIG. 2 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 250 is depicted for enabling use cases of the present invention. As shown, cloud computing environment 250 includes one or more cloud computing nodes 210 with which local computing devices used by cloud consumers, such as, for example, personal digital assistant (PDA) or cellular telephone 254A, desktop computer 254B, laptop computer 254C, and/or automobile computer system 254N can communicate. Nodes 210 can communicate with one another. They can be grouped (not shown) physically or virtually, in one or more networks, such as Private, Community, Public, or Hybrid clouds as described hereinabove, or a combination thereof. This allows cloud computing environment 250 to offer infrastructure, platforms and/or software as services for which a cloud consumer does not need to maintain resources on a local computing device. It is understood that the types of computing devices 254A-N shown in FIG. 2 are intended to be illustrative only and that computing nodes 210 and cloud computing environment 250 can communicate with any type of computerized device over any type of network and/or network addressable connection (e.g., using a web browser).

Figure 3:
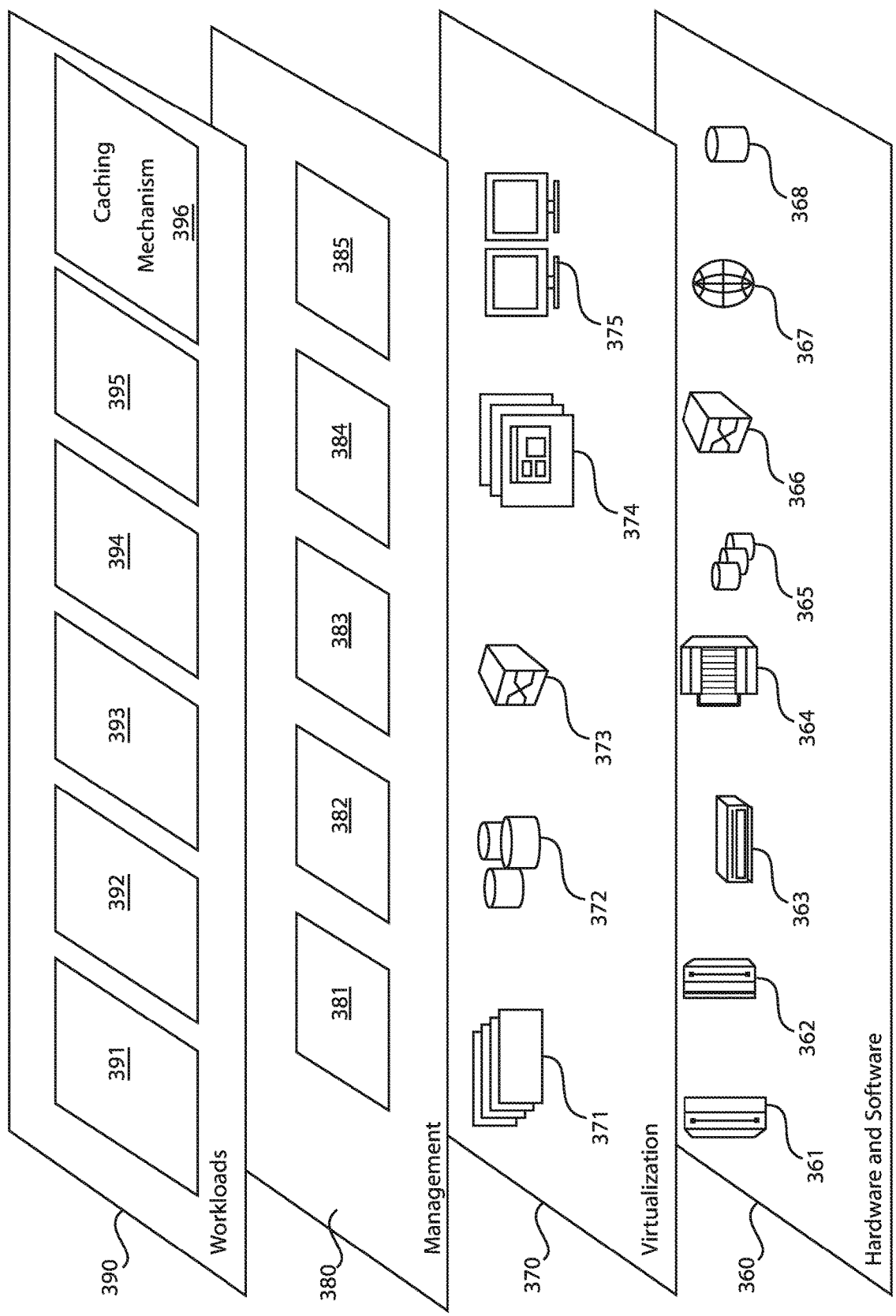
FIG. 3 is a schematic diagram of exemplary abstraction model layers, in accordance with an embodiment of the present invention.

FIG. 3 is a schematic diagram of exemplary abstraction model layers, in accordance with an embodiment of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 360 includes hardware and software components. Examples of hardware components include: mainframes 361; RISC (Reduced Instruction Set Computer) architecture based servers 362; servers 363; blade servers 364; storage devices 365; and networks and networking components 366. In some embodiments, software components include network application server software 367 and database software 368.

Virtualization layer 370 provides an abstraction layer from which the following examples of virtual entities can be provided: virtual servers 371; virtual storage 372; virtual networks 373, including virtual private networks; virtual applications and operating systems 374; and virtual clients 375.

In one example, management layer 380 can provide the functions described below. Resource provisioning 381 provides dynamic procurement of computing resources and other resources that are utilized to perform tasks within the cloud computing environment. Metering and Pricing 382 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 383 provides access to the cloud computing environment for consumers and system administrators. Service level management 384 provides cloud computing resource allocation and management such that required service levels are met. Service Level Agreement (SLA) planning and fulfillment 385 provide pre-arrangement for, and procurement of, cloud computing resources for which a future requirement is anticipated in accordance with an SLA.

Workloads layer 390 provides examples of functionality for which the cloud computing environment can be utilized. Examples of workloads and functions which can be provided from this layer include: mapping and navigation 391; software development and lifecycle management 392; virtual classroom education delivery 393; data analytics processing 394; transaction processing 395; and a caching mechanism 396.

Figure 4:
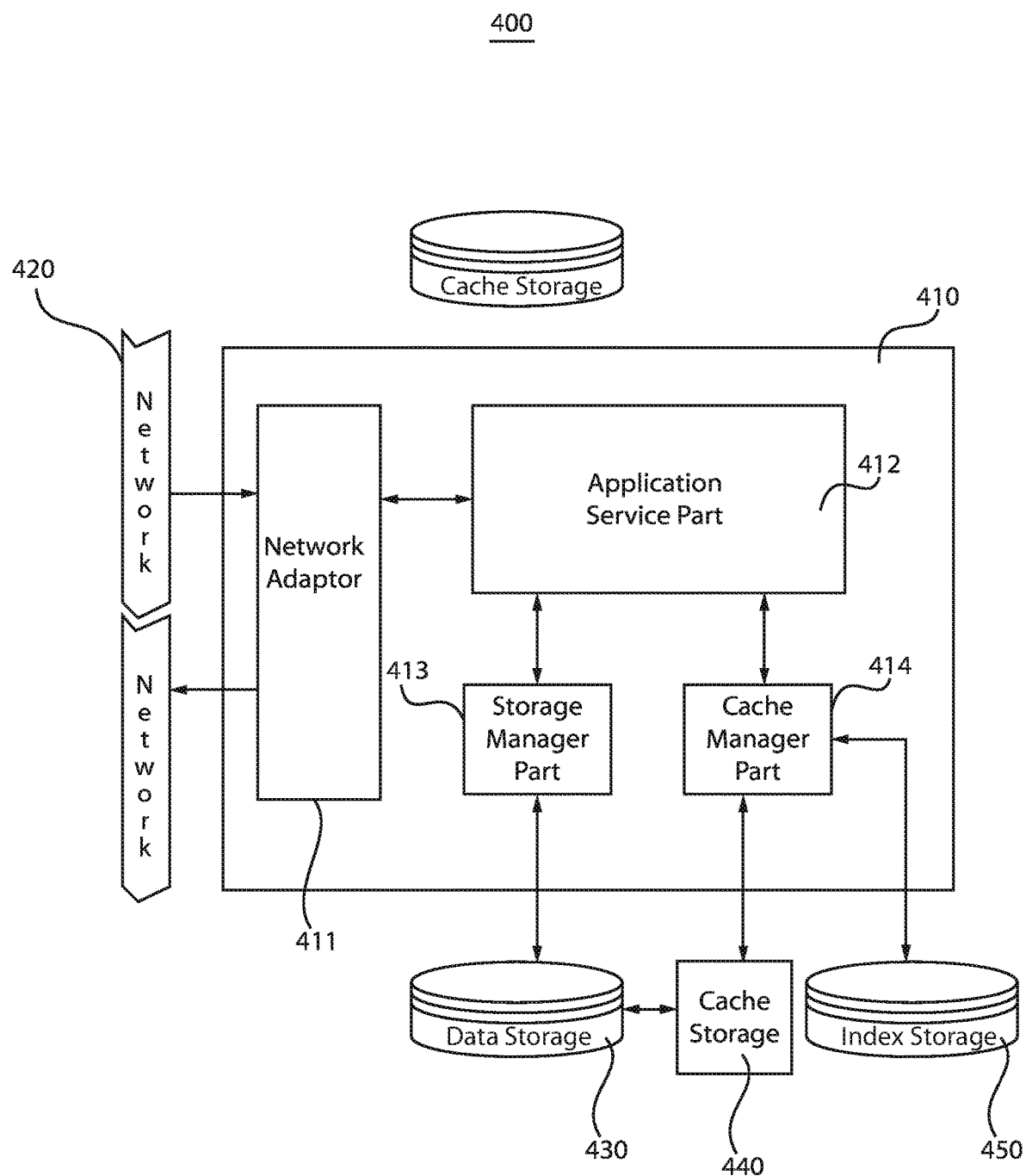
FIG. 4 is a block/flow diagram of a computer system, in accordance with an embodiment of the present invention.

FIG. 4 is a block/flow diagram of a computer system, in accordance with an embodiment of the present invention.

The functional blocks of FIG. 4 can be realized on the computer system by executing program codes with the processor unit through cooperative functions of the software and hardware. The computer system 400 includes a network adaptor 411, where the network adaptor 411 can receive requests and/or instructions from remote computers through the network 420 such as for example Internet and/or local area network (LAN). The computer system 400 includes the application service part 412, where the application service part 412 provides various services in response to the requests and/or instructions. The application service part 412 can include an application for executing programs for the service and returns results of computations to the remote computers through the network 420.

The embodiment of the computer system includes the storage manager part 413 and the cache manager part 414. The storage manager part 413 can manage the data storage 430, such as a hard disk drive, which stores data, programs, and/or results of computation for the computation of the computer system. The cache manager part 414 can manage data caching to the cache storage 440, such as so called "level n" or "application" caches included in the processor, random access memory (RAM), and/or solid state drive (SSD) which can provide fast access to the data. It should be noted that the cache storage 440 is implemented in a fast access storage, such as a physical memory localized in the computer system and/or other fast access storage available through a distributed system and the cache storage per se does not include an element of the cache manager part 414. Also the cache manager part 414 can manage the index storage 450. The index storage 450 stores index values allocated to variables used by the computation of the application service part 412.

Figure 5:
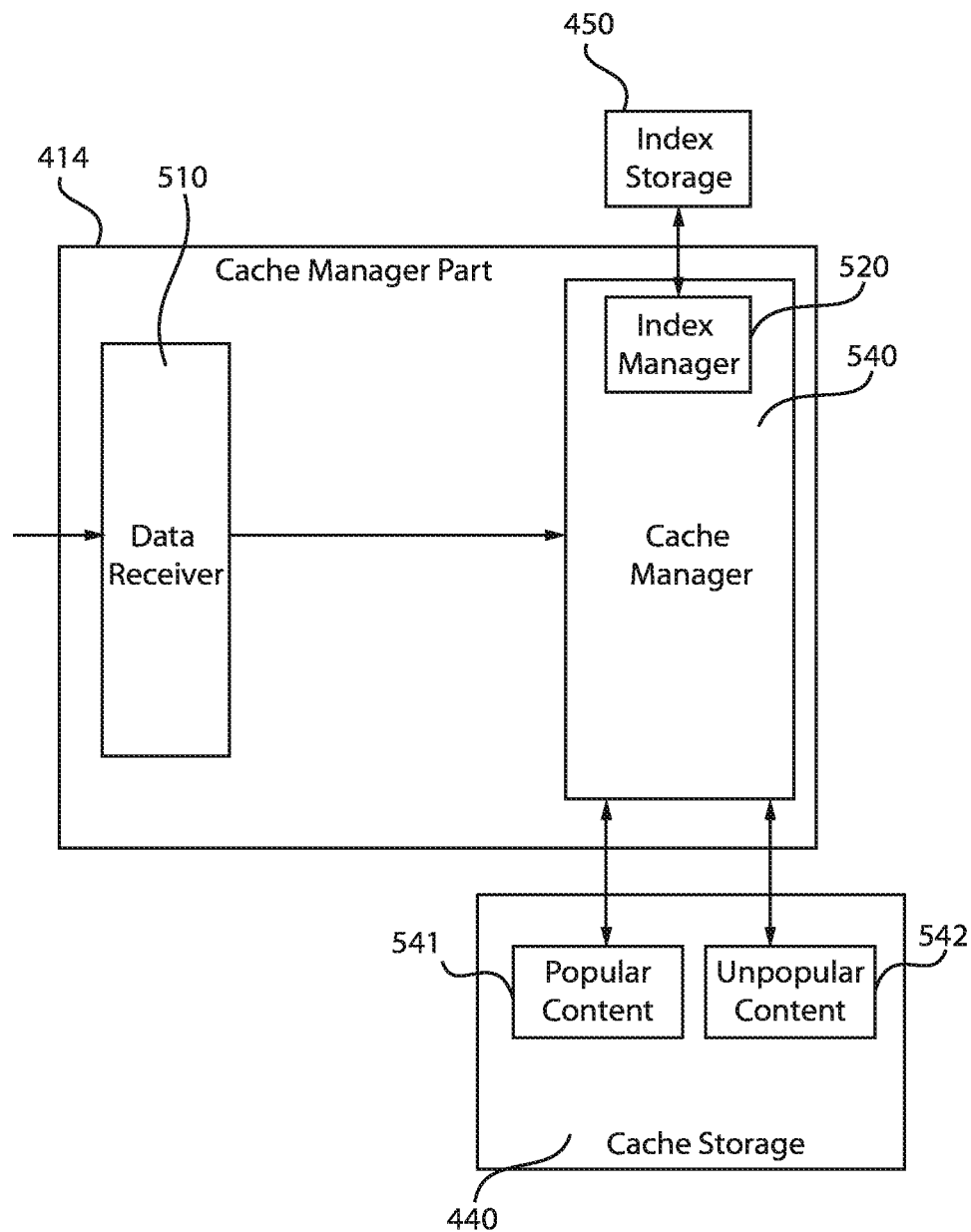
FIG. 5 is a block/flow diagram of an embodiment of a cache manager component shown in FIG. 4, in accordance with an embodiment of the present invention.

FIG. 5 is a block/flow diagram 500 of an embodiment of a cache manager component shown in FIG. 4, in accordance with an embodiment of the present invention.

The cache manager part 414 can include the data receiver 510 and the cache manager 540. The cache manager part 414 can correspond to a controller unit managing the caching mechanism of this embodiment. The data receiver 510 receives various data used for the computation of the application program and sends the data to the cache manager 540. The cache manager 540 manages cache data structures including popular content 541 and unpopular content 542. The cache manager 540 can include an index manager 520 that searches unpopular content from the index storage 450. When a popular content is requested and if the cache manager 540 can retrieve the popular content from the cache storage 440, the popular content is returned to the application program. If the cache manager 540 cannot find the popular content, the popular content is generated depending on the data received by the data receiver 510 and cached into the cache storage 440, and then the popular content is returned to the application program. When an unpopular content is requested and if the index manager 520 can find the unpopular content from the index storage 450, the unpopular content is returned to the application program. If the index manager 520 cannot find the unpopular content, the unpopular content is generated depending on the data received by the data receiver 510 and cached into the cache storage 440 and the index storage 450, and then the unpopular content is returned to the application program.

Figure 6:
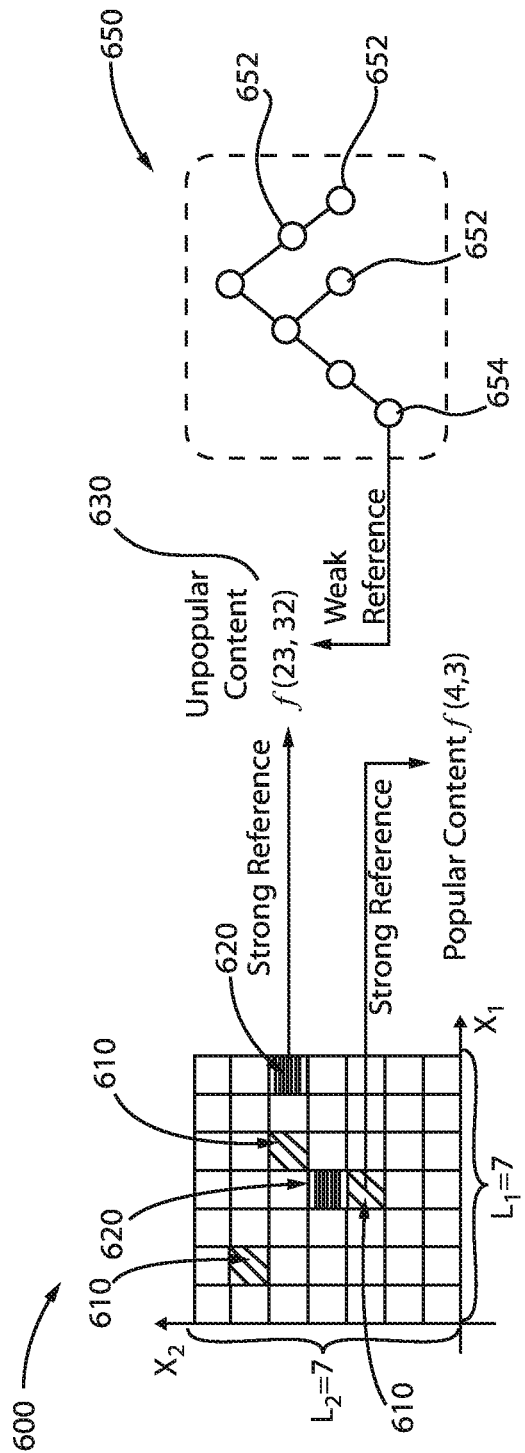
FIG. 6 is a block/flow diagram illustrating a cache mechanism including a cache array and an index structure, in accordance with an embodiment of the present invention.

FIG. 6 is a block/flow diagram illustrating a cache mechanism including a cache array and an index structure, in accordance with an embodiment of the present invention.

In various exemplary embodiments, the cache mechanism uses an array 600 ($L_1 \times L_2 \times \ldots \times L_N$) and an index structure 650.

The cache mechanism maintains calculation results of f(x) where $x=(x_1, x_2, \ldots, x_N)$ and $x_i \in \mathbb{N}$.

For popular content 610: f(x) where $\forall i \in \{1, 2, \ldots, N\}$, $x_i \leq L_i$.

For unpopular content 620: f(x) where $\exists i \in \{1, 2, \ldots, N\}$, $x_i > L_i$.

The position $p=(p_1, p_2, \ldots, p_N)$ of the array holds either of the following:

Strong reference to the popular content f (p) or strong reference to the unpopular content f(r) where $r=(r_1, r_2, \ldots, r_N)$, and from the definition, $r \neq p$ and $\exists i \in \{1, 2, \ldots, N\}$, $r_i > L_i$.

The index structure 650 maintains only unpopular contents 630 through weak references.

The unpopular contents 630 are also referenced from the cache array 600 through strong references.

f(x) is a popular content when the input x is inside the array, e.g., f(x) where $\forall i \in \{1, 2, \ldots, N\}$, $x_i \leq L_i$.

f(x) is an unpopular content when the input x is outside the array, e.g., f(x) where $\exists i \in \{1, 2, \ldots, N\}$, $x_i > L_i$.

An object referenced from at least one strong reference is not released from memory and an object referenced only from weak references is released from memory.

Therefore, the cache mechanism includes a cache array 600 and an index structure 650 including a plurality of nodes 652, 654. The cache array 600 provides for low latency access but cannot cover all the input space. The index structure 650 covers all the input space but needs longer latency access. The popular content 610 can be received directly from the cache array 600, whereas the unpopular content 630 can be received from the index structure 650.

In other words, it is assumed that contents that are frequently accessed are calculated from small input values. Frequently accessed contents are cached into a multi-dimensional array with strong references to accelerate access to the frequently accessed contents. Infrequently accessed contents are cached into an index structure like a hash table or tree with weak references to cover all the input space and to manage the number of cached contents by a caching mechanism.

Figure 7:
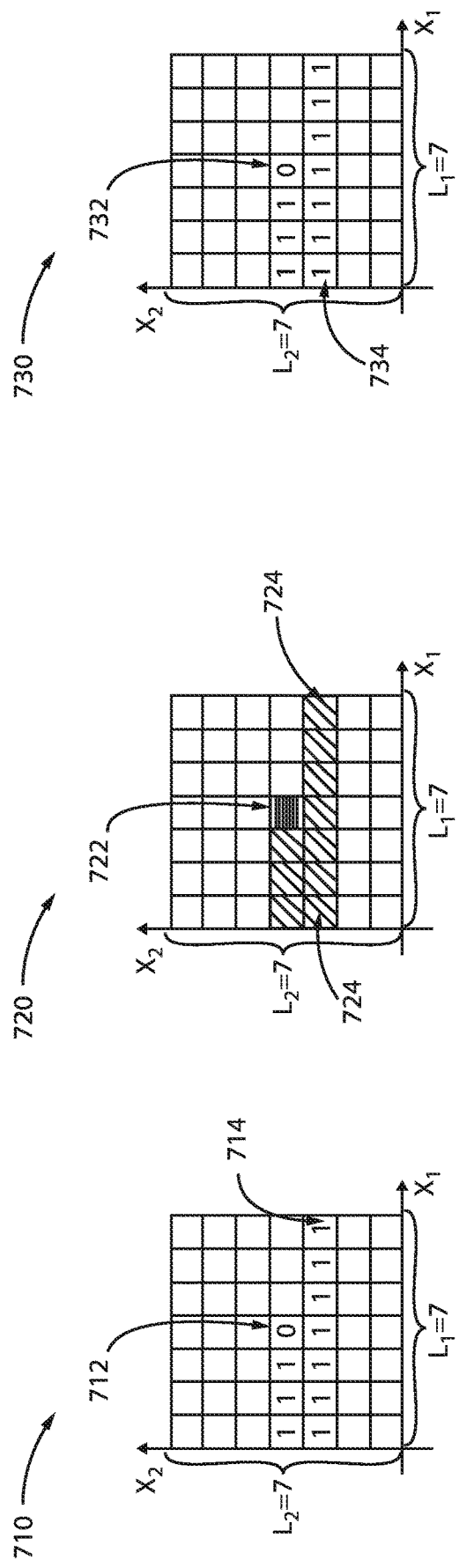
FIG. 7 is a block/flow diagram illustrating two bit vectors interacting with a cache array of the cache mechanism, in accordance with an embodiment of the present invention.

FIG. 7 is a block/flow diagram illustrating two bit vectors interacting with a cache array of the cache mechanism, in accordance with an embodiment of the present invention.

In various exemplary embodiments, the cache mechanism can employ two bit vectors. The first bit vector is an access history bit vector 710 and the second bit vector is a content type bit vector 730. The bit vectors 710, 730 communicate with a cache array 720. The access history bit vector 710 records which contents are accessed recently, whereas the content type bit vector 730 records which contents in the array are popular or unpopular. The cleared bit 712, 722, 732 indicates that the content have not been accessed recently and that the content are an unpopular content. The popular content is designated as 714, 724, 734.

The coordinate system of the multi-dimensional array cache is defined by the coordinates aligned to the indexes in ascending order of the appearance frequencies of variables on $X_1$ and $X_2$ toward the origin. The result calculated from the variables $x_1$ and $x_2$ can be cached to the element $(x_1, x_2)$ of the multi-dimensional array in the cache storage 440. The cache architecture utilizing the multi-dimensional array cache can be referred herein as "Hybrid Cache" or "Hybrid Cache System."

Figure 8:
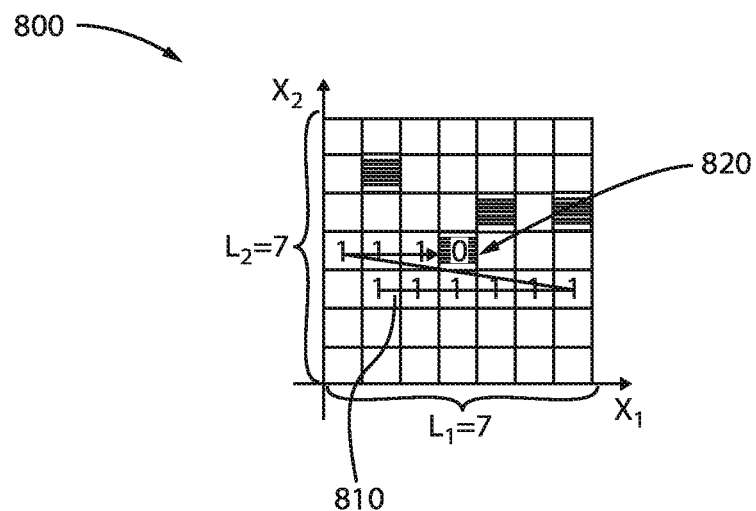
FIG. 8 is a block/flow diagram illustrating an access history vector for an eviction mechanism, in accordance with an embodiment of the present invention.

FIG. 8 is a block/flow diagram illustrating an access history vector 800 for an eviction mechanism, in accordance with an embodiment of the present invention.

The eviction mechanism of this cache can be inspired by CLOCK. When a content is accessed, the bit in the corresponding position of the access-history bit vector is set. When the eviction mechanism needs to select a victim, the eviction mechanism performs a scan over the access-history bit vector 800 to find a zero bit 820 (among the popular content 810) from the last position while clearing each bit until a zero bit is found.

The exemplary embodiments of the present invention detect a victim when the method caches a new content. If the new content is popular, the eviction mechanism overwrites the reference if the corresponding bit in the history vector is zero. If not, the eviction mechanism clears the bit and does not cache the popular content at this time. If the new content is unpopular, the eviction mechanism performs the victim scan. Note that this is only performed when finding a space for an unpopular content, which may not happen so frequently. The eviction mechanism can evict a cached content by overwriting the reference pointer in the array even if it is an unpopular content.

Figure 9:
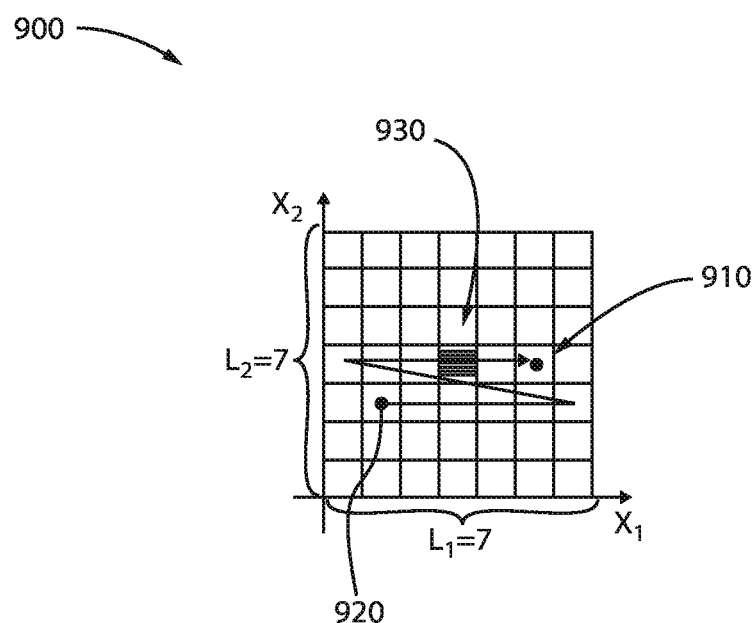
FIG. 9 is a block/flow diagram illustrating an access history vector for a lock-free implementation, in accordance with an embodiment of the present invention.

FIG. 9 is a block/flow diagram 900 illustrating an access history vector for a lock-free implementation, in accordance with an embodiment of the present invention.

Lock free implementation of the get/put operations for popular contents is reasonably simple if the victim scan is serialized. The primary thing that must be avoided is when an unpopular content is observed while trying to get/put a popular content. This happens if the victim scan passes through the access position. This can be prevented by marking a content accessed before fetching the pointer and checking the lap counter since one victim scan cannot remove an accessed content. Unpopular contents are retrieved by the index structure, not by the array. Thus, the array and bit vector(s) can be manipulated to avoid harmful effects for the unpopular get/put operations.

The operations for unpopular contents need to be implemented carefully considering the following characteristics. During a victim scan, the reference pointer in a position can be changed from an unpopular to popular content concurrently but the opposite change does not happen (only the victim scan can perform this). Even if the access history vector is in an inconsistent state, the cache mechanism can give correct contents though it can have an impact on the cache hit ratio.

Lock free implementation for retrieving unpopular contents (i.e., perfect lock free) can be possible if the index structure is lock free. In FIG. 9, the popular content 930 can be evicted from a scan occurring from the last evicted position 920 to the current evicted position 910.

An exemplary algorithm for get/put operations for popular contents can be as follows:

| Algorithm 1: Get popular Content in p = (x,y) |  |
|---|---|
| 1. | If p holds popular content Then |
| 2. | lastLap ⇐ LapCounter |
| 3. | AccessHistory$_p$ ⇐ true |
| 4. | c ⇐ Array$_p$ |
| 5. | If p holds popular content Then |
| 6. | If LapCounter = lastLap Then |
| 7. | Return c |
| 8. | End If |
| 9. | End If |
| 10. | Goto Line 1 // Try Again |
| 11. | End If |

Figure 10:
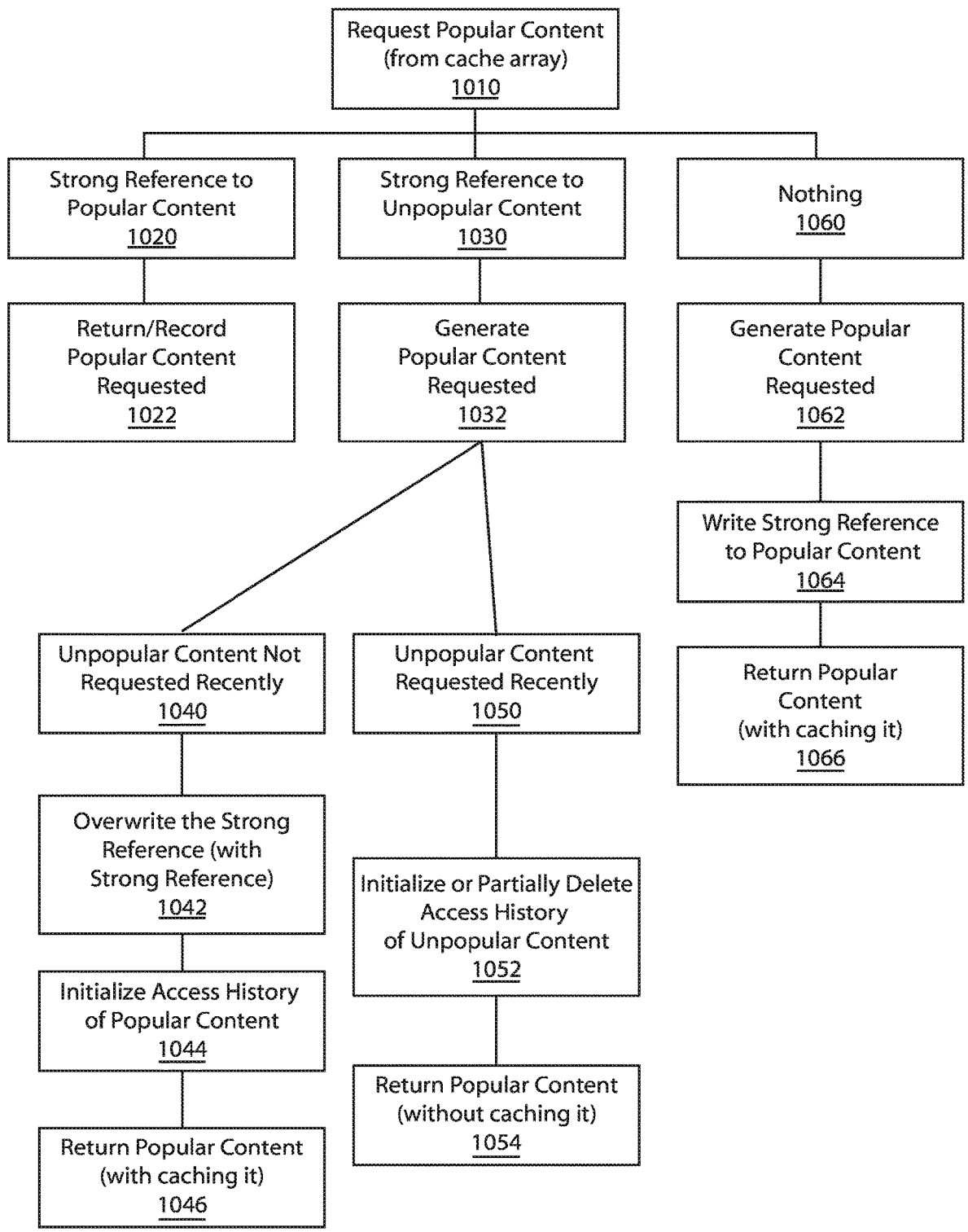
FIG. 10 is a block/flow diagram illustrating a method for implementing the cache mechanism when a popular content is requested, in accordance with an embodiment of the present invention.

FIG. 10 is a block/flow diagram illustrating a method for implementing the cache mechanism when a popular content is requested, in accordance with an embodiment of the present invention.

When a popular content f(x) is requested 1010:

If the position x in the array holds the strong reference to the popular content 1020 (Cache Hit), then return the popular content to the application and record the popular content requested 1022. x represents the input or data stream.

If the position x in the array holds the strong reference to an unpopular content (Cache Miss) 1030, then generate the requested popular content to be returned to the application 1032.

If the unpopular content is not requested recently 1040, then overwrite the strong reference to the unpopular content 1042 with the strong reference to the generated popular content. The method then initializes the access history of the popular content 1044 and returns popular content 1046 (with caching it).

If the unpopular content is requested recently 1050, then initialize or partially delete the access history of the unpopular content 1052 and return the generated popular content to the application 1054 without caching it.

If the position x in the array holds nothing 1060 (Cache Miss, Happens only before the cache is full), then generate the requested popular content to be returned to the application 1062 and write the strong reference to the popular content in the position x in the array 1064. Then return popular content (with caching it) 1066.

Figure 11:
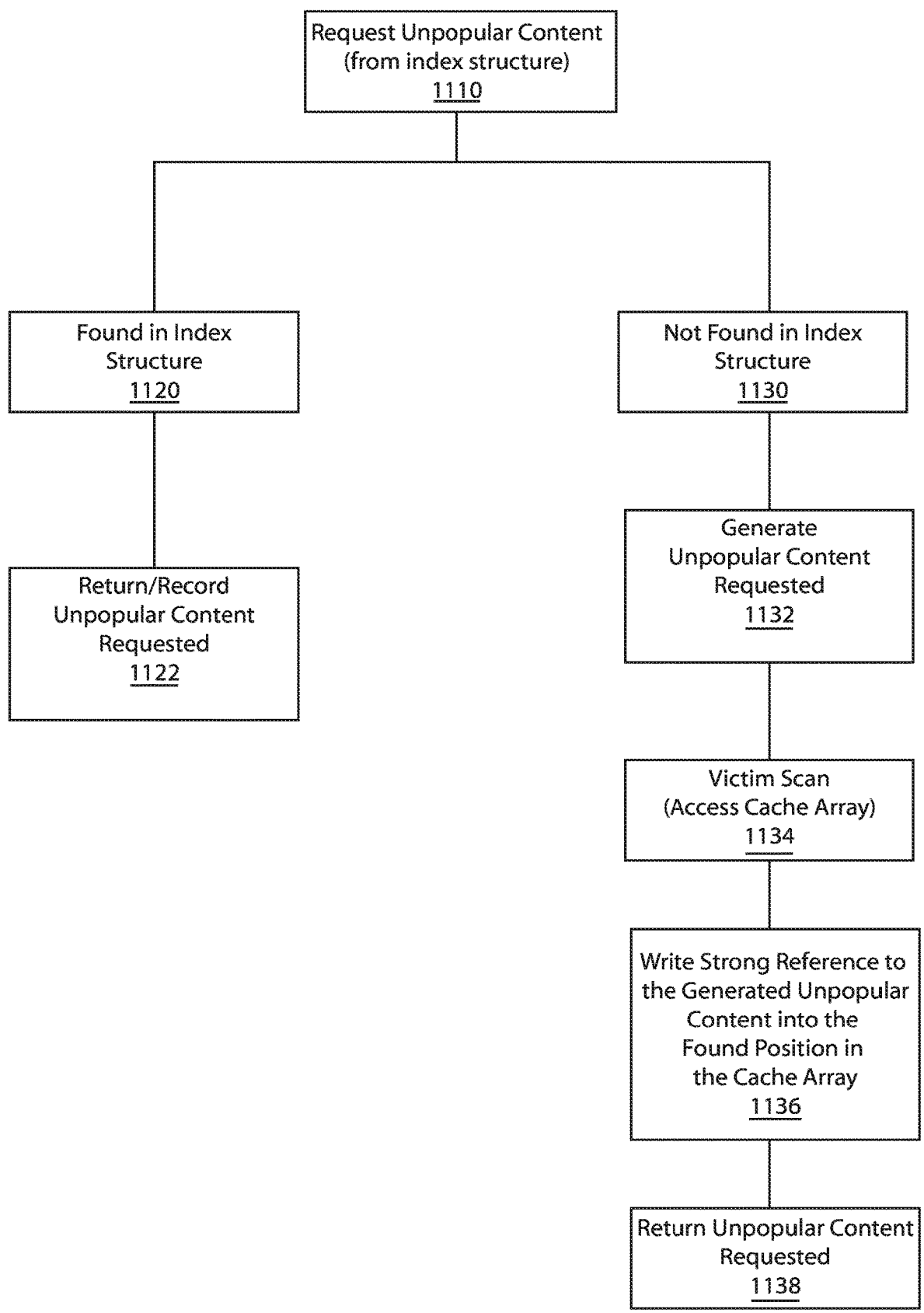
FIG. 11 is a block/flow diagram illustrating a method for implementing the cache mechanism when an unpopular content is requested, in accordance with an embodiment of the present invention.

FIG. 11 is a block/flow diagram illustrating a method for implementing the cache mechanism when an unpopular content is requested, in accordance with an embodiment of the present invention.

When an unpopular content f(x) is requested 1110, if the unpopular content is found in the retrieval data structure 1120 (Cache Hit), then return the unpopular content to the application and record the unpopular content requested 1122.

If the unpopular content is not found in the retrieval data structure 1130 (Cache Miss), then generate the requested unpopular content to be returned to the application 1132.

Start the victim scan 1134 from the next of the last position to find a position in the array which holds nothing or the strong reference to a content that is not accessed recently. Then, write the strong reference to the generated unpopular content into the found position in the cache array 1136. The victim scan performs the scan until it finds a content that is not accessed recently with initializing or partially deleting the access history of each content. Then return the unpopular content requested 1138.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method for caching content (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method executed on a processor in a data processing system for caching content, the computer-implemented method comprising:
    storing content received from a data stream;
    employing a cache array and a retrieval data structure to store the content;
    determining, by the processor, whether the content is popular content or unpopular content;
    storing the popular content and the unpopular content with strong references in specific locations within the cache array, the cache array providing for low latency access, wherein the cache array is used to directly locate and retrieve the popular content and is used by an eviction mechanism for both the popular and unpopular content;
    storing the unpopular content with weak references randomly in the retrieval data structure, the retrieval data structure providing higher latency than the cache array, wherein the retrieval data structure is used to locate and retrieve the unpopular content; and
    after assigning the content into either the cache array or the retrieval data structure based on accessibility requirements of the content, issuing the assigned content to a cache data storage device accessed by a user interface of a computing device communicating with the data processing system.

2. The method of claim 1, further comprising, if the content is determined to be the popular content, accessing the content by employing the data stream as indices or memory addresses of the cache array.

3. The method of claim 2, further comprising, if the content is determined to be the unpopular content, accessing the content by retrieving the retrieval data structure based on the data stream.

4. The method of claim 1, wherein the content is defined as the popular content when the data stream is inside the cache array.

5. The method of claim 4, wherein the content is defined as the unpopular content when the data stream is outside the cache array.

6. The method of claim 1, further comprising employing an access history bit vector to record which content is accessed recently and a content type bit vector to record which content in the cache array is popular or unpopular.

7. The method of claim 1, further comprising, if the popular content is requested,
    determining if a corresponding position of the data stream in the cache array holds a strong reference to an unpopular content;
    generating the requested popular content to be returned to an application;
    replacing the strong reference to the unpopular content with a strong reference to the generated popular content and initializing an access history of the popular content, if the unpopular content is not requested recently; and
    initializing or partially deleting the access history of the unpopular content, and returning the generated popular content to the application without caching it, if the unpopular content is requested recently.

8. The method of claim 1, further comprising, if the unpopular content is requested,
    determining if the unpopular content is not found in the retrieval data structure;
    generating the requested unpopular content to be returned to an application;
    starting a victim scan from a next to last position to find a position in the cache array holding nothing or holding a strong reference to the content that is not accessed recently; and
    writing the strong reference to the generated unpopular content into the found position in the cache array.

9. A non-transitory computer-readable storage medium comprising a computer-readable program executed on a processor in a data processing system for caching content, wherein the computer-readable program when executed on the processor causes a computer to perform the steps of:
    storing content received from a data stream;
    employing a cache array and a retrieval data structure to store the content;
    determining, by the processor, whether the content is popular content or unpopular content;
    storing the popular content and the unpopular content with strong references in specific locations within the cache array, the cache array providing for low latency access, wherein the cache array is used to directly locate and retrieve the popular content and is used by an eviction mechanism for both the popular and unpopular content;
    storing the unpopular content with weak references randomly in the retrieval data structure, the retrieval data structure providing higher latency than the cache array, wherein the retrieval data structure is used to locate and retrieve the unpopular content; and
    after assigning the content into either the cache array or the retrieval data structure based on accessibility requirements of the content, issuing the assigned content to a cache data storage device accessed by a user interface of a computing device communicating with the data processing system.

10. The non-transitory computer-readable storage medium of claim 9, wherein, if the content is determined to be the popular content, the content is accessed by employing the data stream as indices or memory addresses of the cache array.

11. The non-transitory computer-readable storage medium of claim 10, wherein, if the content is determined to be the unpopular content, the content is accessed by retrieving the retrieval data structure based on the data stream.

12. The non-transitory computer-readable storage medium of claim 9, wherein the content is defined as the popular content when the data stream is inside the cache array.

13. The non-transitory computer-readable storage medium of claim 9, wherein the content is defined as the unpopular content when the data stream is outside the cache array.

14. The non-transitory computer-readable storage medium of claim 9, wherein an access history bit vector is employed to record which content is accessed recently and a content type bit vector is employed to record which content in the cache array is popular or unpopular.

15. The non-transitory computer-readable storage medium of claim 9, wherein, if the popular content is requested,
  determining if a corresponding position of the data stream in the cache array holds a strong reference to an unpopular content;
  generating the requested popular content to be returned to an application;
  replacing the strong reference to the unpopular content with a strong reference to the generated popular content and initializing an access history of the popular content, if the unpopular content is not requested recently; and
  initializing or partially deleting the access history of the unpopular content, and returning the generated popular content to the application without caching it, if the unpopular content is requested recently.

16. The non-transitory computer-readable storage medium of claim 9, wherein, if the unpopular content is requested,
  determining if the unpopular content is not found in the retrieval data structure;
  generating the requested unpopular content to be returned to an application;
  starting a victim scan from a next to last position to find a position in the cache array holding nothing or holding a strong reference to the content that is not accessed recently; and
  writing the strong reference to the generated unpopular content into the found position in the cache array.

17. A system for caching content, the system comprising:
  a memory; and
  one or more processors in communication with the memory configured to:
    store content received from a data stream;
    employ a cache array and a retrieval data structure to store the content;
    determine, by the processor, whether the content is popular content or unpopular content;
    store the popular content and the unpopular content with strong references in specific locations within the cache array, the cache array providing for low latency access, wherein the cache array is used to directly locate and retrieve the popular content and is used by an eviction mechanism for both the popular and unpopular content;
    store the unpopular content with weak references randomly in the retrieval data structure, the retrieval data structure providing higher latency than the cache array, wherein the retrieval data structure is used to locate and retrieve the unpopular content; and
    after assigning the content into either the cache array or the retrieval data structure based on accessibility requirements of the content, issue the assigned content to a cache data storage device accessed by a user interface of a computing device communicating with the data processing system.

18. The system of claim 17, wherein, if the content is determined to be the popular content, the content is accessed by employing the data stream as indices or memory addresses of the cache array.

19. The system of claim 17, wherein, if the content is determined to be the unpopular content, the content is accessed by retrieving the retrieval data structure based on the data stream.

20. The system of claim 17, wherein the content is defined as the popular content when the data stream is inside the cache array and the content is defined as the unpopular content when the data stream is outside the cache array.

* * * * *